Oct. 29, 1963   V. K. ELORANTA   3,108,524
PHOTOGRAPHIC APPARATUS
Original Filed July 16, 1958   3 Sheets-Sheet 1
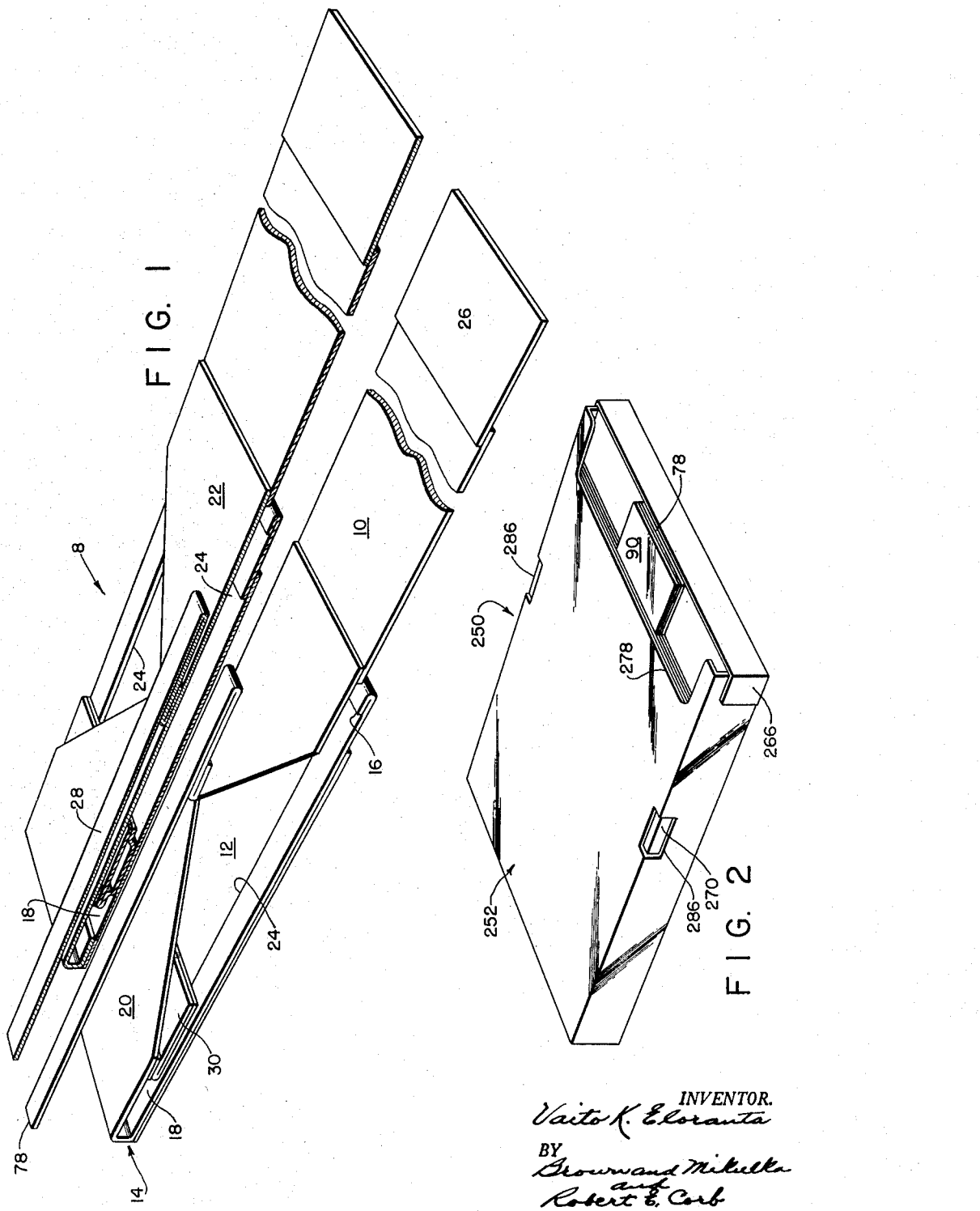
INVENTOR.
Vaito K. Eloranta
BY Brown and Mikulka
and Robert E. Corb
ATTORNEYS Oct. 29, 1963    V. K. ELORANTA    3,108,524
PHOTOGRAPHIC APPARATUS
Original Filed July 16, 1958    3 Sheets-Sheet 2

INVENTOR.
Vaito K. Eloranta
BY Brownard Mikulka
and
Robert E. Corb
ATTORNEYS

Oct. 29, 1963    V. K. ELORANTA    3,108,524
PHOTOGRAPHIC APPARATUS
Original Filed July 16, 1958    3 Sheets-Sheet 3
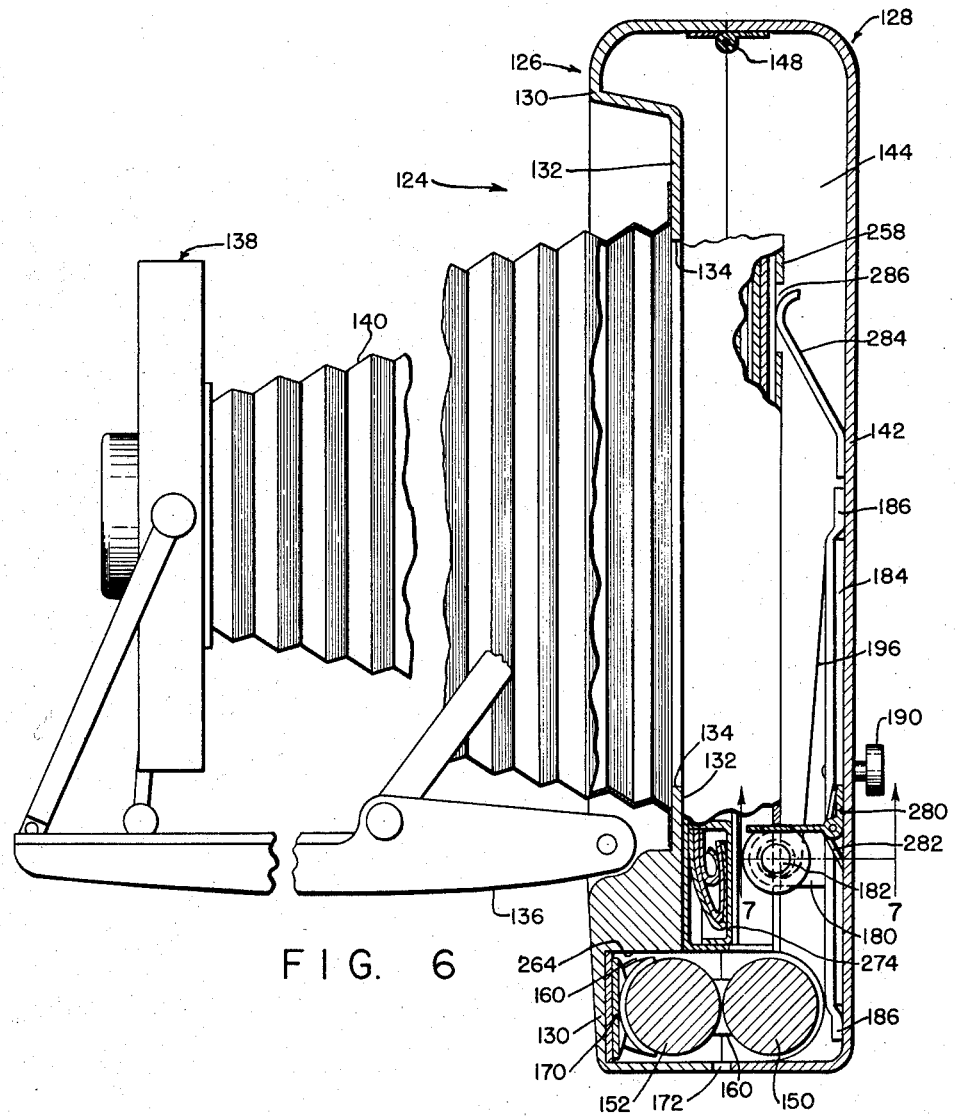
FIG. 6
FIG. 7
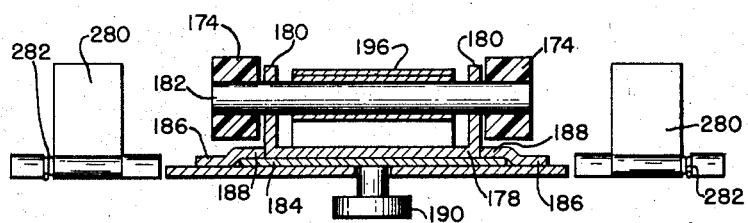
INVENTOR.
Vaito K. Eloranta
BY Brown and Mikulka
and Robert E. Corb
ATTORNEYS

United States Patent Office 3,108,524
Patented Oct. 29, 1963

3,108,524
PHOTOGRAPHIC APPARATUS
Vaito K. Eloranta, Needham, Mass., assignor to Polaroid Corporation, Cambridge, Mass., a corporation of Delaware
Original application July 16, 1958, Ser. No. 749,024, now Patent No. 2,991,702, dated July 11, 1961. Divided and this application Nov. 10, 1960, Ser. No. 68,467
2 Claims. (Cl. 95—13)

This invention relates to novel photographic apparatus and more particularly to improvements in photographic apparatus for exposing and processing photosensitive sheet materials.

This application is a division of my copending U.S. application Serial No. 749,024, filed July 16, 1958, now Patent No. 2,991,702, of July 11, 1961, and entitled Photographic Apparatus and Products Useful Therein.

The above-identified application discloses a photographic film assemblage comprising a plurality of film units each in turn comprising a photosensitive sheet adapted to be exposed to produce an image, a second or receiving sheet which is superposed with the photosensitive sheet to aid in the distribution of a processing fluid between the sheets and preferably to provide a support for a positive transfer print, a leader sheet for connecting the photosensitive and second sheets and a container for enclosing the film units, the container having an opening through which the films units can be withdrawn with the photosensitive and second sheets thereof in superposition. The photosensitive and second sheets of each film unit are initially positioned (for exposure) apart from one another and are moved into superposed registered relation after exposure and prior to withdrawal from the container. The apparatus with which the present invention is concerned may take the form of a camera, magazine, or the like for holding the film assemblage during exposure of the film units and the processing of each film unit; and includes means in the form of pressure-applying members for engaging the superposed photosensitive and second sheets to effect the spreading of a processing fluid between the sheets as they are withdrawn, preferably manually, from the container between the pressure-applying members.

An object of the invention is to provide, in a photographic apparatus of the type described, novel and improved means for engaging one of two photographic sheets of a film assemblage for preventing withdrawal movement of the sheet from the container in which the sheets are held during movement of another sheet within the container realtive to the other sheet into superposition therewith, and for permitting withdrawal of both of said sheets in superposition from the container.

Another object of the invention is to provide means of the above-described type, for preventing movement of one of a pair of sheets during movement of the other and then permitting movement of both of the sheets in superposition, which is characterized by simple and inexpensive construction and which is dependable in operation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a fragmentary perspective view of a film unit adapted to be employed in the apparatus of the invention;

FIG. 2 is a perspective view of a film pack comprising a plurality of film units shown in FIG. 1;

FIG. 6 is a fragmentary sectional view taken intermediate the sides of photographic apparatus in the form of a camera embodying the invention; and FIG. 7 is a sectional view taken along the line 7—7 of FIG. 6.

Figure 3:
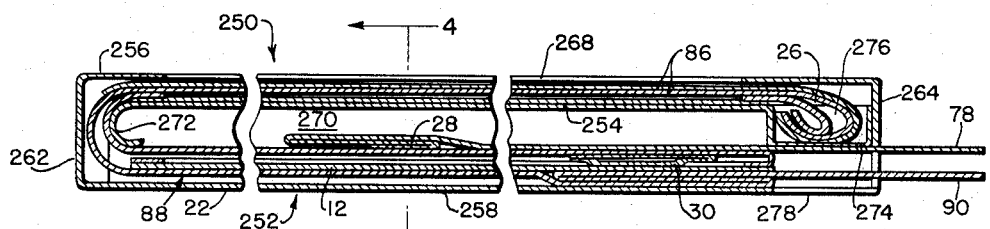
FIG. 3 is a longitudinal sectional view of the film pack of FIG. 2, the section being taken substantially midway between the sides of the pack.

Generally, the photographic apparatus incorporating the invention may be in the form of a camera, camera back, film pack, or a film pack holder or cassette adapted to be employed with a film pack or assemblage comprising a plurality of individual film units. The apparatus includes means for holding the film pack during exposure, means for feeding individual leaders attached to said film units from said apparatus in proper sequence whereby a leader may be grasped for withdrawing a film unit from the apparatus following exposure thereof, and means for effecting the processing of each film unit as it is withdrawn from the apparatus. The film pack or assemblage adapted to be employed in said apparatus includes a plurality of film units, each comprising a photosensitive sheet, a second sheet which is superposed with the photosensitive sheet following exposure thereof, a container of a fluid processing composition adapted to be distributed between the superposed photosensitive and second sheets to effect the processing thereof, and leader means for moving the photosensitive and second sheets into superposition and in engagement with means for distributing the processing fluid.

Reference is now made to FIGURE 1 of the drawings wherein there is illustrated a film unit 8 adapted for use in the apparatus of the invention. Film unit 8 comprises a first or photosensitive sheet 10 and a second or image-receiving sheet 12. The photosensitive sheet is generally rectangular and comprises a layer of photosensitive material carried on a suitable support. The support for the photosensitive layer may comprise any of the flexible sheet materials generally used for film base including paper, plastic and the like, and is preferably opaque to light actinic to the photosensitive material. Second sheet 12 is at least coextensive in area with the area or frame of the photosensitive sheet to be exposed and also comprises a flexible sheet material such as paper, plastic and the like. The second sheet, in the form shown, is substantially coextensive in size with the photosensitive sheet and is also opaque to light actinic to the photosensitive material. While the second sheet may merely aid in the spreading of a fluid processing composition in a thin layer on the photosensitive sheet, in a preferred form of the film unit the second sheet is adapted to provide a support for a positive transfer image produced, for example, by a silver halide diffusion-transfer reversal process, such as described in U.S. Patents Nos. 2,543,181, issued February 27, 1951, and 2,662,822, issued December 15, 1953, both in the name of Edwin H. Land. The second sheet, accordingly, may comprise an image-receiving layer, such as described in the above-mentioned patents, carried on a flexible support sheet.

The photosensitive and second sheets are mounted on an elongated carrier sheet 14 formed of a flexible material such as paper, plastic and the like. Carrier sheet 14 is adapted to perform several functions, including providing a leader for connecting the photosensitive and second sheets, properly locating or registering the sheets relative to one another when the sheets are superposed, mounting a container of a fluid processing composition, cooperating in the spreading of the fluid in a layer of predetermined thickness between the photosensitive and second sheets, determining the area to be processed and the dimensions of the transfer image produced in the second sheet and collecting any excess processing fluid. Carrier sheet 14 comprises a trailing end section 16, a rectangular intermediate section 18 preferably coextensive with second sheet 12, a first tapered or convergent section 20 and a second tapered or convergent section 22, the latter two sections functioning as leaders and for mounting a container of processing fluid. Image-receiving sheet 12 is mounted on intermediate section 18 with the receiving layer of sheet 12 located adjacent the carrier sheet. Intermediate section 18 is provided with a generally rectangular aperture 24 defining the area of the image-receiving sheet against which the fluid processing composition is spread and wherein a transfer image is produced. The lateral margins of intermediate section 18 adjacent the sides of aperture 24 cooperate for confining the processing fluid between the sheets and for controlling the thickness of the layer of fluid spread between the sheets. Photosensitive sheet 10 is secured at its leading edge to the end edge of second tapered section 22 with the emulsion surface of the photosensitive sheet facing in the same direction relative to the carrier sheet as the image-receiving layer of second sheet 12. A trailer sheet 26 is provided attached to the trailing edge of photosensitive sheet 10 and cooperates with trailing end section 16 of carrier sheet 14 for collecting and retaining excess processing fluid.

A narrow, elongated leader strip 28 is provided secured to second tapered section 22 at the juncture of sections 20 and 22 substantially midway between the leading edge of second sheet 12 and the leading edge of photosensitive sheet 10. The first and second tapered sections of the carrier sheet are folded at this point midway between the photosensitive and second sheets and the film unit is processed by drawing leader 28 and the tapered sections in superposed relation between means for applying compressive pressure to the film unit. The photosensitive and second sheets are thus registered with one another in superposed relation by drawing on leader 28 so as to cause the tapered sections to fold at a point intermediate the leading edges of the photosensitive and second sheets.

The photosensitive and second sheets are processed by a fluid composition carried in a rupturable container, designated 30, mounted on first tapered section 20. The container is formed substantially as shown in the above-mentioned U.S. Patent No. 2,543,181 and comprises a rectangular blank of fluid- and air-impervious sheet material folded longitudinally upon itself to provide two walls bonded together at their margins to form an elongated cavity for the processing fluid. The longitudinal seal is weaker than the end seals and becomes unsealed in response to hydraulic pressure generated within the fluid contents of the container by the application of compressive pressure thereto. Container 30 is mounted on first tapered section 20 on the side thereof opposite second sheet 12, extends substantially from side to side of the carrier sheets and includes a liquid-carrying cavity which is preferably at least as wide as aperture 24 in the carrier sheet. Container 30 is mounted with the longitudinal edge, which is adapted to become unsealed, facing the second sheet and located adjacent the leading edge thereof.

Film unit 8, when assembled for exposure, is positioned with first and second tapered sections 20 and 22 folded at the first tapered section adjacent the leading edge of the second sheet against the image-receptive surface of the second sheet. Second tapered section 22 is folded adjacent the leading edge of photosensitive sheet 10 so that the latter is folded back against the first and second tapered sections with the emulsion surface of the photosensitive sheet facing in the same direction as the image-receptive surface of the second sheet. It will be note that with film unit 8 in this position, the photosensitive layer of the photosensitive sheet is located outermost so that it can be exposed, the image-receptive layer of the second sheet faces inwardly and the first and second tapered sections of the carrier sheet are disposed between the photosensitive and second sheets. Container 30, in this assembled position of the film unit, is disposed with the longitudinal edge adapted to become unsealed facing the trailing end of the second sheet and the leading end of the photosensitive sheet.

Figure 4:
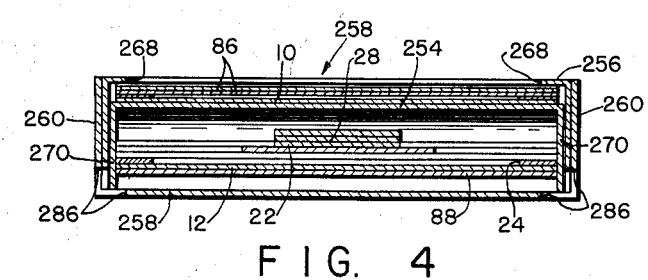
FIG. 4 is a sectional view taken along the line 4—4 of FIG. 3.

An assemblage of film units, in the form of a film pack 250, is illustrated in FIGS. 2 through 4 of the drawings. The film pack comprises a housing or container 252 adapted to be fabricated from stiff sheet material, particularly paper or cardboard, and a pressure plate 254 formed of thin sheet metal mounted within the container. Container 252 is generally parallelepiped in shape, having a rectangular forward wall 256 and a rear wall 258, both substantially equal in width to film unit 8 and equal in length to the portion of film unit 8 comprising photosensitive sheet 10 and trailer sheet 26 or the portion comprising second sheet 12 and portion 78 of leader 28 projecting beyond the leading end of the second sheet. Forward and rear walls 256 and 258 are joined together by side walls 260 and a trailing end wall 262 to form a container open at its leading end. A leading end wall 264 is provided joined to forward wall 256 and extending toward rear wall 258 across the open leading end of container 252 for partially closing the leading end of the container. Container 252 is formed from two blanks of relatively stiff sheet material such as cardboard, with side walls 260 and end wall 262 comprising overlapping portions of the two blanks. End wall 264 preferably comprises a flap on the leading end of the panel of the blank comprising forward wall 256 and is folded across the open leading end of the container after a plurality of film units 8 and pressure plate 254 have been loaded into the container. The flap comprising leading end wall 264 is held in place by tabs 266 secured to side walls 260. Forward wall 256 is provided with a rectangular exposure aperture 268 through which photosensitive sheets positioned within the container are adapted to be exposed.

Figure 5:
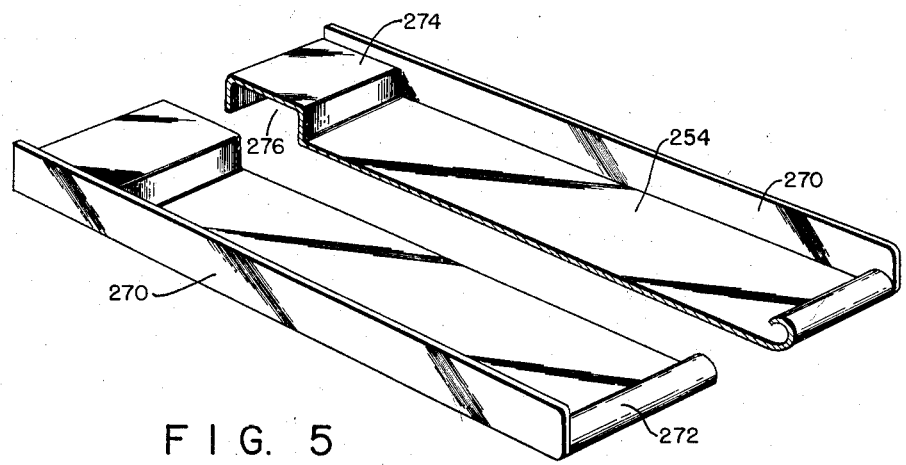
FIG. 5 is a perspective view of a component of the film pack of FIG. 4.

Mounted within the container of the film pack is a pressure plate 254 (see FIG. 5) substantially rectangular in shape, being approximately equal in width to film units 8 and including rearwardly extending lateral flanges 270, a rolled end section 272 at its trailing end between lateral flanges 270 and a step or raised section 274 at its leading end having a substantially flat support surface and a generally U-shaped cross section. Pressure plate 254 is mounted within container 252 with flanges 270 disposed against side walls 260 and extending toward rear wall 258 and step 274 located adjacent leading end wall 264. A plurality of film units 8 are mounted within container 252 with each photosensitive sheet 10, located between pressure plate 254 and forward wall 256, in alignment with exposure aperture 268. The rectangular intermediate section 18 of each film unit 8 is bent around rolled end section 272 and the second sheet, first and second tapered sections and leader strip are disposed behind the pressure plate between it and the rear wall 258 of the container. A plurality of film units 8 are provided in the container, each arranged in the same manner with the photosensitive sheets arranged in one stack in front of the pressure plate and the second sheets arranged in another stack behind the pressure plate. Trailer sheets 26 are disposed in a recess 276 formed by the forward side of step 274, while portions 78 of leaders 28 are located within the container supported on the rear surface of step 274 between the latter and rear wall 258. Film pack 250 also includes cover sheets 86 located across aperture 268 in closing relation thereto and a leader 88 having a leading end section 90 also supported on step 274.

Each leader strip 28 is folded back upon itself toward the trailing end of the film pack and thence forward, so that only a relatively short portion of the leader strip projects beyond the leading edge of the second sheet from between the second sheet and the photosensitive sheet. This short leader portion, designated 78, of leader strip 28 projects from the container through a recessed or cutaway section 278 in the region of rear wall 258 overlying step 274.

Reference is now made to FIG. 6 of the drawings wherein there is shown photographic apparatus embodying the invention and designed to employ film packs of the type described. The apparatus may be in the form of a cassette, film pack adapter or film pack holder for use with a camera or, as shown, in the form of a camera 124 comprising a forward housing section 126 and a rear housing section 128. Forward housing section 126 includes a forward housing wall 130 having a recessed section 132 including an aperture 134 through which exposures can be effected. A hinged forward wall 136 is provided for covering recessed section 132 and mounting a conventional lens and shutter assembly 138, the latter being connected to recessed section 132 by a collapsible bellows 140 secured at one end to the lens and shutter assembly and secured at its rear end to the recessed section around aperture 134. In lieu of forward wall 136, lens and shutter assembly 138 and the bellows 140, the forward and rear housing sections of the apparatus may be constructed in the form of a camera back or film pack adapter intended to be mounted on and coupled with the back of a camera.

Rear housing section 128 includes a rear wall 142 which cooperates with forward housing section 126 to provide a chamber 144 behind aperture 134 for containing a film pack, of the type described, in position for exposure across aperture 134. This film pack is adapted to be mounted in chamber 144 with forward wall 256 of the pack against the rear surface of recessed section 132 and with aperture 268 in alignment with aperture 134. Rear housing section 128 is preferably pivotally mounted on forward housing section 126 adjacent one end of the housing, herein shown and designated for purposes of description, as the upper end of the housing, by hinge 148, thereby permiting the separation of the two housing sections for loading of a film pack into chamber 144. Suitable latch means (not shown) of conventional type are provided at the opposite (lower) end of the housing for retaining the two housing sections together in the closed or operative position shown in the drawings.

The film units comprising the film pack are exposed and then processed by being withdrawn from the camera between a pair of pressure-applying members which distribute a processing fluid between the photo-sensitive and second sheets of each film unit. Camera 124, accordingly, comprises a pair of pressure-applying members in the form of elongated rolls 150 and 152 comprising a pressure-applying device mounted within the housing adjacent the lower end thereof. Pressure-applying rolls 150 and 152 are mounted for pivotal movement in juxtaposition with their axes substantially in a common plane and are biased toward one another for applying compressive pressure to the sheets of a film unit as said film unit is drawn therebetween. As a means for mounting pressure-applying rolls 150 and 152, there is provided a genarally U-shaped support member 154 having a pair of parallel arms 156 joined by a connecting member 158. Each of arms 156 includes a keyhole-shaped slot 160 and rolls 150 and 152 are provided with stub shafts at their ends rotatably journaled in bushings (not shown) engaged in slots 160. A spring 170 is provided mounted intermediate its ends on connecting member 158 between the latter and roll 152 with its ends in engagement with the bushings for urging roll 152 toward roll 150.

Spreading of the processing fluid from a container 30 between a photosensitive sheet 10 and second sheet 12 is effected by advancing the sheets in superposition between rolls 150 and 152 commencing with the leading end portions of the sheets in the region of the container. In order to insure spreading of the fluid in a layer of predetermined depth completely over the area of the second sheet bordered by aperture 24, the amount of fluid usually provided in container 30 is in excess of that required for the layer of fluid. Trailing end section 16 and trailer sheet 26 are adapted to cooperate with rolls 150 and 152 for collecting and retaining any excess fluid spread from between the trailing ends of the photosensitive and second sheets. This is accomplished by constructing the pressure-applying rolls and bushings mounting the rolls so that the bushings engage one another and retain the rolls spaced apart from one another by a fixed minimum amount providing a gap between the rolls having a depth substantially greater than the combined thickness of the trailing end section 16 and trailer sheet 26. By virtue of this arrangement, as the trailing end section and trailer sheet move between the rolls, a space is provided between the trailing end section and trailer sheet in which excess fluid may be collected and retained. The minimum depth of the gap between rolls 150 and 152 is approximately equal to the combined thickness of photosensitive sheet 10, second sheet 12 and the layer of fluid to be spread therebetween. As previously noted, trailing end section 16 is folded back upon itself to form two adjacent portions which cooperate to function in the manner of a container for collecting and retaining any excess processing fluid. As the photosensitive and second sheets are drawn between the pressure-applying members, the folded sections of trailing end section 16 tend to remain spaced apart slightly so that any excess processing fluid enters between the two folded sections and is retained therein as the folded sections move between the pressure-applying members, in spite of any application of compressive pressure to the folded sections by the pressure-applying members. This form of trapping means finds particular utility where the minimum gap between the pressure-applying members is small so that the spacing between the trailing end section 16 and trailer sheet 26 is also small and might prove insufficient to retain all of the excess fluid squeezed from between the trailing ends of the photosensitive and second sheets.

Pressure-applying rolls 150 and 152, support member 154 and their associated elements comprise a unit mounted on forward housing section 126 between forward wall 130 and rear wall 142 adjacent the lower end of the camera housing. An opening 172 is provided in the lower end of the housing in alignment with the gap between the pressure-applying rolls to permit movement of the sheet materials between the rolls and from the camera.

The film pack, mounted within the camera, is positioned for exposure and disposed entirely within the camera with leaders 78 and 90 located within the camera on the inside of rolls 150 and 152. The camera, accordingly, includes means for advancing leaders 78 and 90, one at a time, between the pressure-applying rolls from the camera through opening 172 in the lower end of the camera housing where the leaders may be grasped for drawing cover sheets 86 and the film units from the camera between the pressure-applying rolls.

The leader advancing means are manually operable from the exterior of the camera and, in the form shown, comprise a pair of rolls 174 having friction-generating surfaces adapted to engage the leaders while rolls 174 are simultaneously moved downward toward pressure-applying rolls 150 and 152 and are rotated (counterclockwise). Rolls 174 are mounted adjacent rear wall 142 between the lower or leading end of the film pack and pressure-applying rolls 150 and 152 are adapted to be displaced toward the front of the camera for engaging and advancing the leaders. Step 274 of the pressure plate is designed to facilitate engagement of the leaders by providing means against which rolls 174 are adapted to act. Rolls 174 are formed of a material having a high coefficient of friction such as rubber, while the leaders, being formed of paper, and the rear surface of step 274 have a relatively lower coefficient of friction so the rolls can engage and move the rearmost leader relative to any remaining leaders.

As a means for mounting and rotating rolls 174, there is provided a support plate 178 preferably formed of a resilient sheet material such as sheet metal. Support plate 178 is elongated and generally rectangular in shape and includes a pair of upstanding support brackets 180 on one end extending parallel to one another toward the front of the camera housing for mounting rolls 174. Rolls 174 are secured to the end of a shaft 182 mounted for rotation on support brackets 180 with the rolls disposed outside of the brackets and the peripheries of said rolls projecting forward of the brackets. Support plate 178 is secured at its end opposite rolls 174, to a slide plate 184 mounted for sliding or reciprocating rotating movement against the inner surface of rear wall 142 by a retaining plate 186. Slide plate 184 is wider than support plate 178 and is engaged at its edges between rear wall 142 and portions of retaining plate 186 surrounding a slot 188 in the retaining plate. Retaining plate 186 is so formed and slot 188 is so dimensioned as to permit support plate 178 to extend through slot 188 and be reciprocated in the direction of the ends of the camera housing.

Support plate 178 is normally positioned with its lower end (mounting rolls 174) against slide plate 184 and, being resilient, can be deformed forward away from the slide plate for moving rolls 174 toward backing member 176 and into engagement with leaders located between the rolls and backing member. A manually engaged button 190 is secured to support plate 178 and projects rearward from the housing through an opening 192 in slide plate 184 and a slot 194 in rear wall 142. Button 190 is adapted to be engaged and pressed inward and downward for simultaneously deforming support plate 178 so as to move rolls 174 forward toward member 176 into engagement with leaders and for moving the support plate and rolls downward toward rolls 150 and 152 with rolls 174 held in engagement with a leader.

As a preferred means for rotating rolls 174 in a counterclockwise direction as said rolls are moved downwardly toward rolls 150 and 152 in engagement with a leader held against step 274, there is provided a negator spring 196 secured at one end to shaft 182, coiled around the shaft in a counterclockwise direction and secured at its other (upper) end with respect to rear wall 142, preferably on retaining plate 186 above rolls 174. By virtue of this arrangement, as shaft 182 and rolls 174 are displaced downwardly relative to the camera housing, negator spring 196 is caused to uncoil, imparting a counterclockwise rotary movement to the rolls. The negator spring performs the additional function of returning rolls 174 upward to their initial position when button 190 is released by virtue of the tendency of the negator spring to recoil itself.

Camera 124, when loaded with a film pack such as film pack 34, is adapted to be employed for making photographs by first engaging button 190 and pressing the button inward and downward for advancing leader 90 connected to cover sheets 86 between pressure-applying rolls 150 and 152 through passage 172 from the camera. Leader 90 may then be grasped for drawing cover sheets 86 around the end of pressure plate 60, from the film pack, between the pressure-applying rolls, and from the camera. Each film unit is processed following exposure in a similar manner. The operator engages button 190, pressing it inward and downward for advancing a leader 78 between the pressure-applying rolls from the camera, so that the leader may be grasped for drawing the photosensitive sheet 10 around rolled end section 66 of pressure plate 60 into superposition with the corresponding second sheet 12, and then drawing the photosensitive and second sheets and superposition between the pressure-applying rolls from the camera. During movement of second tapered section 22 and then the photosensitive sheet around the trailing end of the pressure plate and into superposition with the second sheet, first tapered section 20 is required to roll upon itself, this action being facilitated by virtue of the taper of the two sections and by creasing or prefolding the carrier sheet along a transverse line at the junction of sections 20 and 22.

To permit rolls 174 to engage leaders supported on the rear surface of step 274, rear wall 258 is provided with a generally U-shaped recess or cut-away section 278 in the region of rear wall 258 overlying step 274.

Means are provided in the form of a pair of springs 284 mounted at their ends on rear wall 142 adjacent the sides of the camera housing for urging the pressure plate forward. The free ends of springs 284 extend forwardly for engaging flanges 270 of the pressure plate 254 of a film pack 250 mounted within the camera housing. To permit engagement of the flanges of the pressure plate by springs 284, openings 286 are provided in the lateral edge portions of film pack 250 extending through rear wall 258 and side walls 260.

The invention comprehends means in the camera for engaging the leading end of each second sheet (within the container) for preventing movement of the second sheet, as a photosensitive sheet is moved toward the opening in the film pack container relative to and into superposition with the second sheet. This means comprises a pair of L-shaped engagement members 280 pivotally mounted at the intersection of the arms of each of said members on rear wall 142 at opposite sides of rolls 174. Each of engagement members 280 is mounted with one arm extending forwardly toward step 274 and with the other arm extending upwardly adjacent rear wall 142 for positioning the first-mentioned arm. Means such as torsion springs 282 are provided for urging engagement members 280 in a clockwise direction (viewing FIG. 6) into the operative position shown. In this position forwardly extending arms of members 280 project into the path of movement of the sheets where the arms engage the leading edge of the rearmost film unit adjacent opposite sides of leaders 90 and portions 78 for preventing movement of the second sheets of said film unit during withdrawal movement of a leader and movement of a photosensitive sheet into superposition with the second sheet. A relatively flexible sheet material, such as black paper, plastic, cloth or the like, may be provided for covering openings 286 to prevent the admission of light through the openings into the film pack.

Members 280 are pivotable, from the operative position shown, in a counterclockwise direction to permit withdrawal of a photosensitive and second sheet in superposition from the container in response to withdrawal movement of the leader attached thereto.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for use with a film assemblage including a container having an opening through which a pair of sheets are withdrawn in superposition and support means for supporting the leading end of one of said sheets adjacent said opening, said apparatus comprising, in combination: housing means for enclosing said film assemblage, said housing means including a passage aligned with said opening in said container and defining a path along which said sheets can be withdrawn from said container through said passage; an engagement member mounted adjacent the side of said path opposite said support means and having an end section extending toward said support means into said path of movement of one of said sheets of said pair for engaging the leading edge of said one sheet and preventing the movement of said one sheet during movement of said other sheet relative to and in frictional contact with said one sheet; said engagement member being mounted for movement of said end section into and out of said path; and resilient means for biasing said end section into said path in a direction opposite the direction of withdrawal movement of said sheets from said container; said end section being movable against the bias of said resilient means out of said path by engagement with said one sheet during withdrawal movement thereof.

2. The photographic apparatus of claim 1 wherein said engagement member is mounted for pivotal movement between a first position in which said end section is located in the path of movement of said one sheet and a second position wherein said end section is displaced in the direction of movement of said sheets out of said path.

References Cited in the file of this patent
UNITED STATES PATENTS
2,789,488    Eloranta _____ Apr. 23, 1957